(12) United States Patent
Watanabe (10) Patent No.: US 8,605,337 B2
(45) Date of Patent: Dec. 10, 2013

(54) IMAGE SCANNING DEVICE (75) Inventor: Toshihiro Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 497 days.

(21) Appl. No.: 12/891,201

(22) Filed: Sep. 27, 2010

(65) Prior Publication Data

US 2011/0075227 A1 Mar. 31, 2011

(30) Foreign Application Priority Data

Sep. 30, 2009 (JP) ................................ 2009-227851

(51) Int. Cl.
*H04N 1/04* (2006.01)
*H04N 1/00* (2006.01)
*H04N 1/40* (2006.01)

(52) U.S. Cl.
USPC ........... 358/474; 358/408; 358/403; 358/404; 358/444; 358/468; 358/443; 358/483; 358/482; 358/496

(58) Field of Classification Search
None
See application file for complete search history.

(56) References Cited

U.S. PATENT DOCUMENTS

| 6,160,640 | A | 12/2000 | Ohmori | |
|---|---|---|---|---|
| 2011/0188085 | A1* | 8/2011 | Oosaki et al. | 358/1.17 |
| 2011/0188091 | A1* | 8/2011 | Watanabe et al. | 358/448 |
| 2011/0242625 | A1* | 10/2011 | Yokochi | 358/498 |

FOREIGN PATENT DOCUMENTS

| JP | HEI 9-200437 | | 7/1997 |
|---|---|---|---|
| JP | 10042105 A | * | 2/1998 |
| JP | H10-42105 | | 2/1998 |
| JP | 11-55530 | | 2/1999 |
| JP | 2001-127952 | | 5/2001 |
| JP | 2007-81779 | | 3/2007 |
| JP | 2007081779 A | * | 3/2007 |
| JP | 2007-274449 | | 10/2007 |
| JP | 2007274449 A | * | 10/2007 |
| JP | 2008-118269 | | 5/2008 |
| JP | 2008118269 A | * | 5/2008 |

OTHER PUBLICATIONS

Japanese Office Action dated Jan. 10, 2012 from related Japanese Application 2009-227851, together with an English-language translation.
Official Action dated Jun. 28, 2011 received from the Japanese Patent Office from related Japanese Application No. 2009-227851, together with an English-language translation.

* cited by examiner

*Primary Examiner* — Cheukfan Lee
(74) *Attorney, Agent, or Firm* — Scully, Scott, Murphy & Presser, PC (57) ABSTRACT

An image scanning device has first and second image scanning units to scan an image on the front and rear surfaces of a document to sequentially output image data on a line-by-line basis. A determining unit determines whether or not the number of lines of the front image is greater than or equal to a predetermined number, and whether or not the number of lines of the rear image is greater than or equal to the predetermined number. A processing unit reads out the front and rear image data on a line-by-line basis for the predetermined number of lines and performs image-processing on the readout data if the number of lines of the front image data is greater than or equal to the predetermined number and performs image-processing on the readout data if the number of lines of the rear image data is greater than or equal to the predetermined number.

6 Claims, 5 Drawing Sheets

IMAGE SCANNING DEVICE

CROSS REFERENCE TO RELATED APPLICATION

This application claims priority from Japanese Patent Application No. 2009-227851 filed Sep. 30, 2009. The entire content of the priority application is incorporated herein by reference.

TECHNICAL FIELD

The present invention relates to an image scanning device that has two scanning sensors and that is capable of scanning images on front and rear surfaces of an original document by using the two scanning sensors.

BACKGROUND

Japanese laid open patent application publication No. HEI 9-200437 discloses a double-sided document scanning device including two scanning sensors. One of the scanning sensors scans an image on a front surface of an original document, and remaining one of the scanning sensors scans an image on a rear surface of the original document. Each of the scanning sensors generates image data based on the scanned image of each front and rear surface.

SUMMARY

It is an object of the present invention to provide an image scanning device that can reduce memory capacity required for storing image data generated by two scanning sensors.

In order to attain the above and other objects, the present invention provides an image scanning device including a first image scanning unit, a second image scanning unit, a first storing unit, a second storing unit, a number of line determining unit, a determining unit, and a processing unit. The first image scanning unit is configured to scan an image on one of surfaces of an original document conveyed along a conveying path at a predetermined first scanning position to sequentially output image data on a line-by-line basis. Each line of the image data representing a line image extends in a main scanning direction that is perpendicular to a conveying direction, in which the original document is conveyed along the conveying path. The second image scanning unit is configured to scan an image on a remaining one of the surfaces of the original document conveyed along the conveying path at a predetermined second scanning position downstream along the conveying path from the first scanning position to sequentially output image data on a line-by-line basis. Each line of the image data representing a line image extends in the main scanning direction. The first storing unit is configured to store the image data generated by the first image scanning unit. The second storing unit is configured to store the image data generated by the second image scanning unit. The number of line determining unit determines the number of lines of the image data that is stored in each of the first storing unit and the second storing unit. The determining unit executes a first determination to determine whether or not the number of lines of the image data stored in the first storing unit is greater than or equal to a predetermined number to obtain a first determination result, and executes a second determination to determine whether or not the number of lines of the image data stored in the second storing unit is greater than or equal to the predetermined number to obtain a second determination result. The determining unit executes the first determination and the second determination in alternation with each other. The processing unit is configured to be capable of reading out the image data on a line-by-line basis from each of the first storing unit and the second storing unit to image-process the readout data. The processing unit reads out the image data for the predetermined number of lines from the first storing unit and image-processes the readout data if the first determination result indicates that the number of lines of the image data stored in the first storing unit is greater than or equal to the predetermined number. The processing unit reads out the image data for the predetermined number of lines from the second storing unit and image-processes the readout data if the second determination result indicates that the number of lines of the image data stored in the second storing unit is greater than or equal to the predetermined number.

According to another aspect, the present invention provides an image scanning device including a first image scanning unit, a second image scanning unit, a first storing unit, a second storing unit, a number of line determining unit, a determining unit, and a processing unit. The first image scanning unit is configured to scan an image on one of surfaces of an original document conveyed along a conveying path at a predetermined first scanning position to sequentially output image data on a line-by-line basis. Each line of the image data representing a line image extends in a main scanning direction that is perpendicular to a conveying direction, in which the original document is conveyed along the conveying path. The second image scanning unit is configured to scan an image on a remaining one of the surfaces of the original document conveyed along the conveying path at a predetermined second scanning position downstream along the conveying path from the first scanning position to sequentially output image data on a line-by-line basis. Each line of the image data representing a line image extends in the main scanning direction. The first storing unit is configured to store the image data generated by the first image scanning unit. The second storing unit is configured to store the image data generated by the second image scanning unit. The number of line determining unit determines the number of lines of the image data that is stored in each of the first storing unit and the second storing unit. The determining unit determines which of the first and second storing units stores a greater number of lines' worth of the image data than the other. The processing unit is configured to be capable of reading out the image data on a line-by-line basis from each of the first storing unit and the second storing unit to image-process the readout data. The processing unit reads out the image data from one of the first storing unit and the second storing unit that is determined by the determining unit, and image-processes the readout data.

According to still another aspect, the present invention provides an image scanning device including a first image scanning unit, a second image scanning unit, a storing unit, a number of line determining unit, a determining unit, and a processing unit. The first image scanning unit is configured to scan an image on one of surfaces of an original document conveyed along a conveying path at a predetermined first scanning position to sequentially output image data on a line-by-line basis. Each line of the image data representing a line image extends in a main scanning direction that is perpendicular to a conveying direction, in which the original document is conveyed along the conveying path. The second image scanning unit is configured to scan an image on a remaining one of the surfaces of the original document conveyed along the conveying path at a predetermined second scanning position downstream along the conveying path from the first scanning position to sequentially output image data on a line-by-line basis. Each line of the image data representing a line image extends in the main scanning direction. The storing unit is configured to store the image data generated by the first image scanning unit and the second image scanning unit. The number of line determining unit determines the number of lines of the image data that is generated by the first image scanning unit and is stored in the storing unit, and the number of lines of the image data that is generated by the second image scanning unit and is stored in the storing unit. The determining unit determines which of the image data generated by the first image scanning unit and the image data generated by the second image scanning unit is to be processed based on the determined number of lines of the image data. The processing unit reads out the image data that is determined to be processed by the determining unit from the storing unit on a line-by-line basis and image-processes the readout data.

BRIEF DESCRIPTION OF THE DRAWINGS

The particular features and advantages of the present invention as well as other objects will become apparent from the following description taken in connection with the accompanying drawings, in which.

DETAILED DESCRIPTION

First Embodiment

An image scanning device according to a first embodiment of the present invention will be described while referring to FIGS. 1 to 4.

[Structure]

Figure 1:
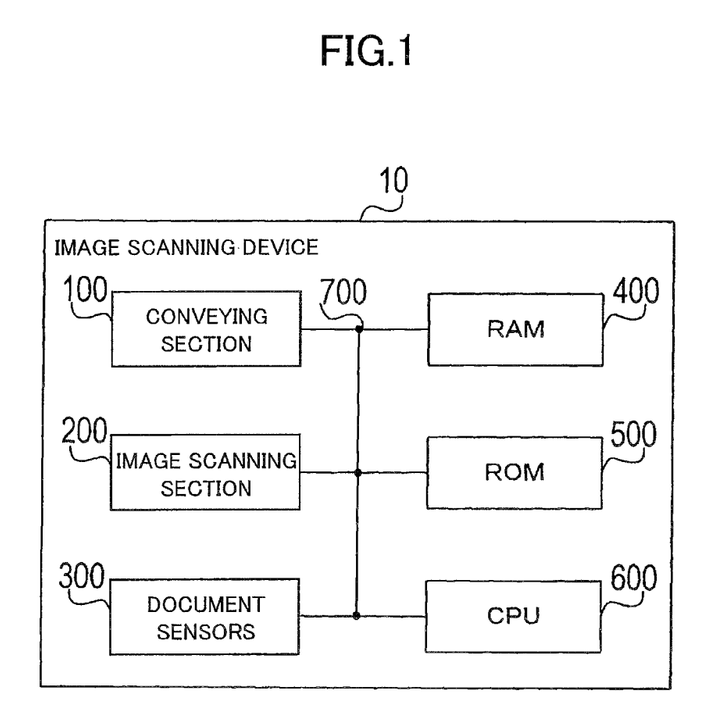
FIG. 1 is a block diagram showing a structure of an image scanning device according to a first embodiment of the present invention.

As shown in FIG. 1, the image scanning device 10 according to the first embodiment includes a conveying section 100 for conveying an original document along a conveying path, an image scanning section 200 for scanning images on front and rear surfaces of the original document conveyed along the conveying path, a group of document sensors 300 for detecting the original document conveyed along the conveying path, a RAM 400 and a ROM 500 both for storing various data, and a CPU 600 for executing various processes based on programs stored in the ROM 500 to control overall functions of the image scanning device 10. The conveying section 100, the image scanning section 200, the document sensors 300, the RAM 400, the ROM 500, and the CPU 600 are connected with one another through an internal bus 700.

Figure 2:
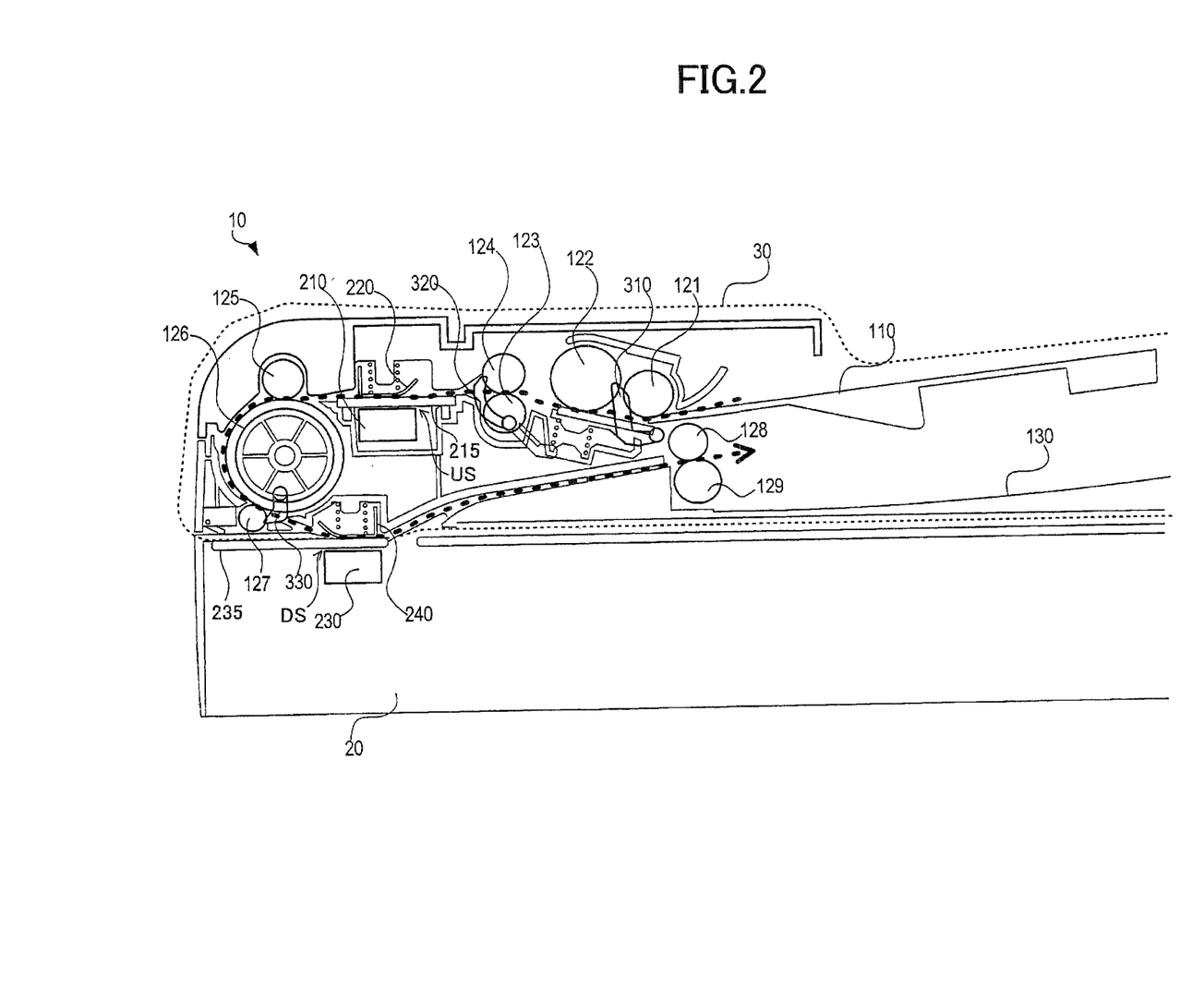
FIG. 2 is a schematic cross-sectional view of a document cover provided in the image scanning device according to the first embodiment of the present invention.

As shown in FIG. 2, the image scanning device 10 includes a document placing table 20 and a document cover 30. The document placing table 20 functions as a flatbed scanner. The document cover 30 is pivotally connected to the document placing table 20 by a hinge, and is movable between an open position and a closed position about the hinge relative to the document placing table 20. The cross section of the document cover 30 is shown in FIG. 2.

The conveying section 100 functions as an ADF (auto document feeder), and is provided integrally with the document cover 30. The conveying section 100 includes a document feeding section 110, conveying rollers 121 to 129, and a document discharging section 130. The conveying section 100 conveys an original document placed on the document feeding section 110 toward the document discharging section 130 by the conveying rollers 121 to 129 along the conveying path (indicated by a broken line in FIG. 2) in a conveying direction. Along the conveying path, an upstream side scanning position US and a downstream side scanning position DS are defined. The downstream side scanning position DS is on a downstream side of the upstream side scanning position US in the conveying direction.

The image scanning section 200 includes a first CIS (contact image sensor) 210, a second CIS 230, a first document pressing section 220, and a second document pressing section 240 that are provided along the conveying path. The image scanning section 200 is capable of simultaneously scanning images on front and rear surfaces of an original document while the original document is being conveyed on the conveying path. The first CIS 210 and the first document pressing section 220 are provided in the document cover 30 at positions corresponding to the upstream side scanning position US. The first CIS 210 and the first document pressing section 220 are disposed in confrontation with each other, with a scanning glass plate 215 for the first CIS 210 being located therebetween. The first document pressing section 220 is configured to press the original document passing through the upstream side scanning position US against the scanning glass plate 215. The first CIS 210 reads an image from the original document through the scanning glass plate 215. The second CIS 230 is movably provided in the document placing table 20 so as to be at a position corresponding to the downstream side scanning position DS. The second document pressing section 240 is provided in the document cover 30 at a position corresponding to the downstream side scanning position DS. When the second CIS 230 is at the position corresponding to the downstream side scanning position DS, the second CIS 230 confronts the second document pressing section 240, with a scanning glass plate 235 for the second CIS 230 being located between the second CIS 230 and the second document pressing section 240. The second document pressing section 240 is configured to press the original document passing through the downstream side scanning position DS against the scanning glass plate 235. The second CIS 230 reads an image from the original document through the scanning glass plate 235.

The document sensors 300 include a first document sensor 310, a second document sensor 320, and a third document sensor 330 which are provided along the conveying path to detect the original document conveyed on the conveying path. The first document sensor 310 is located immediately on the downstream side of the document feeding section 110. The first document sensor 310 is for detecting whether or not an original document exists on the conveying path at the location of the first document sensor 310. By the first document sensor 310, it is known whether the original document is placed on the document feeding section 110. The second document sensor 320 is located immediately on the upstream side of the upstream side scanning position US. The second document sensor 320 is for detecting whether or not the original document exists on the conveying path at the location of the second document sensor 320. By the second document sensor 320, it is known whether the original document reaches the upstream side scanning position US. The third document sensor 330 is located immediately on the upstream side of the downstream side scanning position DS. The third document sensor 330 is for detecting whether or not the original document exists on the conveying path at the location of the third document sensor 330. By the third document sensor 330, it is known whether the original document reaches the downstream side scanning position DS.

Next, the detailed structure of the image scanning section 200 in the image scanning device 10 will be described while referring to FIG. 3.

Figure 3:
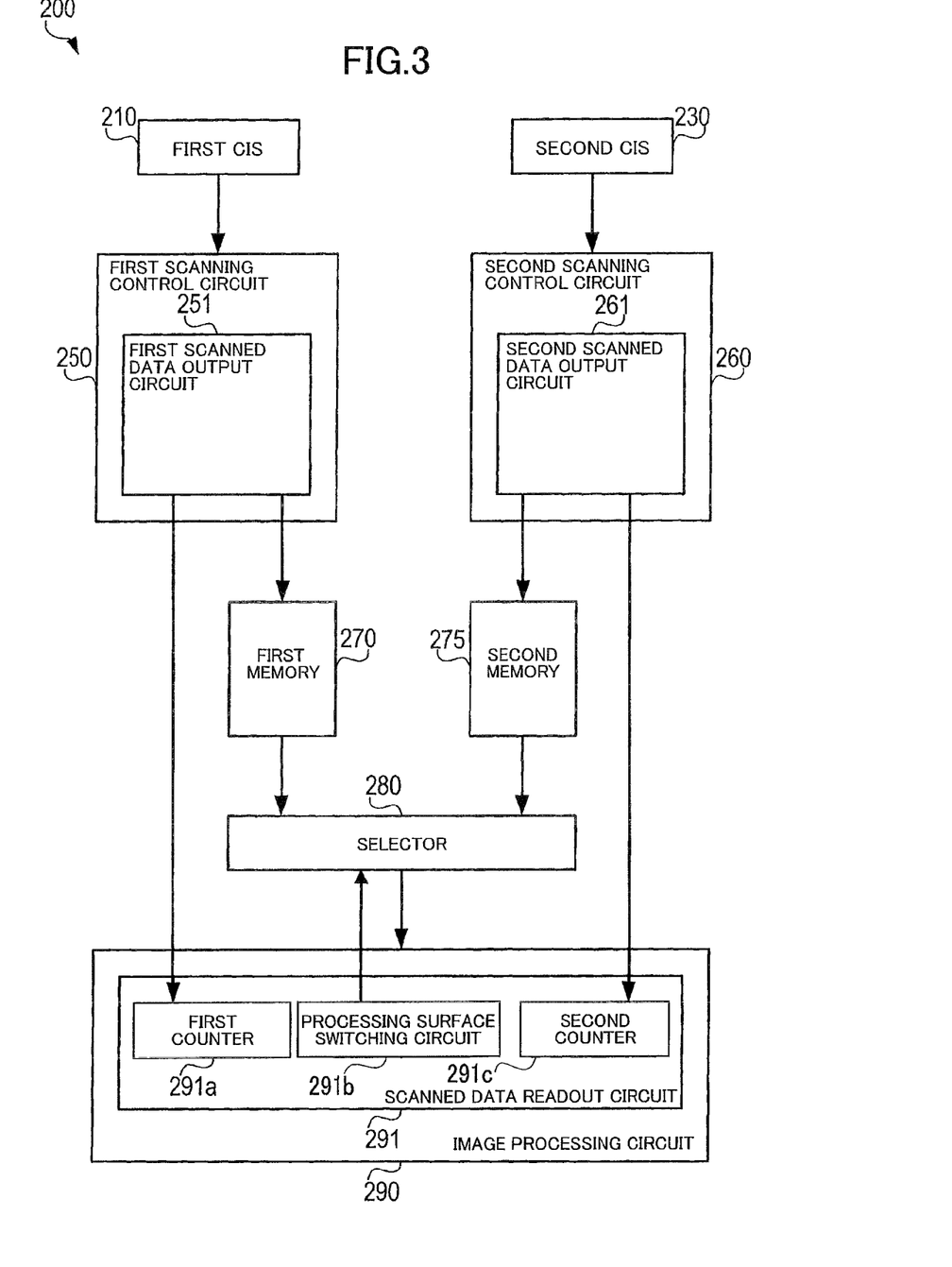
FIG. 3 is a block diagram showing a structure of an image scanning section in the image scanning device shown in FIG. 1.

As shown in FIG. 3, the image scanning section 200 includes the two contact image sensors (the first CIS 210 and the second CIS 230), two scanning control circuits (a first scanning control circuit 250 and a second scanning control circuit 260), two memories (a first memory 270 and a second memory 275), a selector 280, and an image processing circuit 290. The image processing circuit 290 has a scanned data readout circuit 291. The scanned data readout circuit 291 has a first counter 291$a$, a processing surface switching circuit 291$b$, and a second counter 291$c$.

The first CIS 210 is for scanning an image on a rear surface of an original document passing through the upstream side scanning position US to generate scanned data corresponding to the image on the rear surface. The first CIS 210 outputs the scanned data to the first scanning control circuit 250.

The first scanning control circuit 250 is for sequentially converting the scanned data received from the first CIS 210 from analog to digital on a line-by-line basis, to thereby generate successive sets of digital scanned data. Each set of digital scanned data represents a line image extending in a main scanning direction that is perpendicular to the conveying direction. The first scanning control circuit 250 includes a first scanned data output circuit 251. The first scanned data output circuit 251 is for outputting on a line-by-line basis the scanned data which has been converted to digital by the first scanning control circuit 250, to write the scanned data into the first memory 270. Each time the first scanned data output circuit 251 writes one line's worth of scanned data into the first memory 270, the first scanned data output circuit 251 outputs a count-up signal to the first counter 291$a$.

The first scanning control circuit 250 is also for controlling the first CIS 210 to scan an image on the rear surface of the original document.

The second CIS 230 is for scanning an image on a front surface of the original document passing through the downstream side scanning position DS to generate scanned data corresponding to the image on the front surface. The second CIS 230 outputs the scanned data to the second scanning control circuit 260.

The second scanning control circuit 260 has the same configuration with the first scanning control circuit 250. The second scanning control circuit 260 is for sequentially converting the scanned data received from the second CIS 230 from analog to digital on a line-by-line basis, to thereby generate successive sets of digital scanned data. Each set of digital scanned data represents a line image extending in the main scanning direction. The second scanning control circuit 260 includes a second scanned data output circuit 261 that has the same configuration with the first scanned data output circuit 251. The second scanned data output circuit 261 is for outputting on a line by line basis the scanned data which has been converted to digital by the second scanning control circuit 260, to write the scanned data into the second memory 275. Each time the second scanned data output circuit 261 writes one line's worth of scanned data into the second memory 275, the second scanned data output circuit 261 outputs a count-up signal to the second counter 291$c$.

The second scanning control circuit 260 is also for controlling the second CIS 230 to scan an image on the front surface of the original document.

The selector 280 is for selecting either one of the first memory 270 and the second memory 275.

The image processing circuit 290 is for reading out the scanned data from the first memory 270 or the second memory 275 and for performing an image-processing on the readout data. Examples of the image processing include correction, enlargement, reduction, and color conversion of the scanned data.

The scanned data readout circuit 291 is for reading out the scanned data on a line-by-line basis from the first memory 270 or the second memory 275 which has been selected by the selector 280. Both of the first counter 291$a$ and the second counter 291$c$ are line counters.

Upon receipt of a count-up signal from the first scanned data output circuit 251, the first counter 291$a$ increments by one the number of lines that is currently indicated by the first counter 291$a$. Further, each time the scanned data readout circuit 291 reads out one line's worth of scanned data from the first memory 270, the first counter 291$a$ subtracts the number one (1) from the number of lines that is currently indicated by the first counter 291$a$.

The second counter 291$c$ has the same configuration with the first counter 291$a$. Upon receipt of a count-up signal from the second scanned data output circuit 261, the second counter 291$c$ increments by one the number of lines that is currently indicated by the second counter 291$c$. Further, each time the scanned data readout circuit 291 reads out one line's worth of scanned data from the second memory 275, the second counter 291$c$ subtracts the number one (1) from the number of lines that is currently indicated by the second counter 291$c$.

The processing surface switching circuit 291$b$ is for controlling the selector 280 to select either one of the first memory 270 and the second memory 275.

Each of the first and second scanning control circuits 250 and 260 performs a scan-and-writing process by controlling the corresponding CIS 210 or 230 to scan an image of an original document to generate scanned data and by controlling the corresponding scanned data output circuit 251 or 261 to write the scanned data into the corresponding memory 270 or 275. Each of the first and second scanning control circuits 250 and 260 performs the scan-and-writing process to generate and write a predetermined number of lines' worth of scanned data at a predetermined scan-and-write speed. On the other hand, the image processing circuit 290 executes a reading-and-processing process on scanned data by reading out the scanned data from the first memory 270 or the second memory 275 selected by the selector 280 and performing an image-processing on the readout data. The image processing circuit 290 executes the reading-and-processing process on the predetermined number of lines' worth of scanned data at a predetermined read-and-process speed. The read-and-process speed is at least twice as fast as the predetermined scan-and-write speed.

In other words, it takes a predetermined length of time (scan-and-write period of time) by the first scanning control circuit 250 to perform the scan-and-writing process to generate and write the predetermined number of lines' worth of scanned data. Similarly, it takes the same predetermined length of time (scan-and-write period of time) by the second scanning control circuit 260 to perform the scan-and-writing process to generate and write the predetermined number of lines' worth of scanned data. On the other hand, it takes a predetermined length of time (read-and-process period of time) by the image processing circuit 290 to execute the reading-and-processing process on the predetermined number of lines' worth of scanned data. The length of the read-and-process period of time is shorter than or equal to a half of the length of the scan-and-write period of time.

If the number of lines indicated by the first counter 291a exceeds a predetermined threshold, the first scanning control circuit 250 controls the conveying section 100 to stop conveying the original document so that the first CIS 210 temporarily stops scanning an image of the original document. After processes executed by the image processing circuit 290 have progressed and the number of lines indicated by the first counter 291a has fallen below the predetermined threshold, the first scanning control circuit 250 controls the conveying section 100 to restart conveying the original document and controls the first CIS 210 to restart scanning the image of the original document.

Similarly, if the number of lines indicated by the second counter 291c exceeds a predetermined threshold, the second scanning control circuit 260 controls the conveying section 100 to stop conveying the original document so that the second CIS 230 temporarily stops scanning an image of the original document. After processes executed by the image processing circuit 290 have progressed and the number of lines indicated by the second counter 291c has fallen below the predetermined threshold, the second scanning control circuit 260 controls the conveying section 100 to restart conveying the original document and controls the second CIS 230 to restart scanning the image of the original document.

Alternatively, if the number of lines indicated by the first counter 291a exceeds the predetermined threshold, the first scanning control circuit 250 may control the conveying section 100 to reduce a conveying speed of the original document so as to slow down an image scanning speed. After processes executed by the image processing circuit 290 have progressed and the number of lines indicated by the first counter 291a has fallen below the predetermined threshold, the first scanning control circuit 250 may control the conveying section 100 to restore the conveying speed to the original speed and may control the first CIS 210 to restart scanning the image of the original document at the original speed.

Similarly, if the number of lines indicated by the second counter 291c exceeds the predetermined threshold, the second scanning control circuit 260 may control the conveying section 100 to reduce a conveying speed of the original document so as to slow down an image scanning speed. After processes executed by the image processing circuit 290 have progressed and the number of lines indicated by the second counter 291c has fallen below the predetermined threshold, the second scanning control circuit 260 may control the conveying section 100 to restore the conveying speed to the original speed and may control the second CIS 230 to restart scanning the image of the original document at the original speed.

[Operation]

Figure 4:
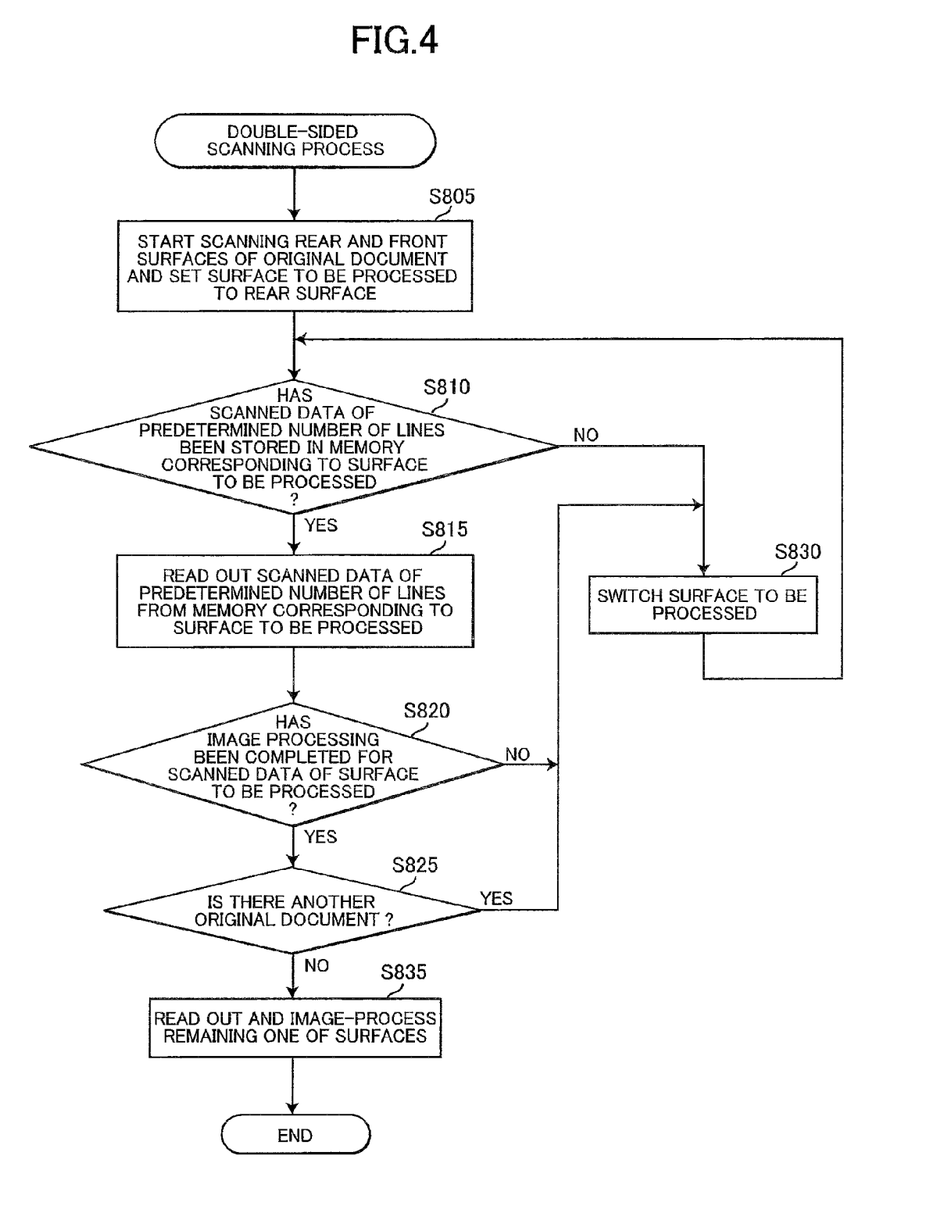
FIG. 4 is a flowchart illustrating steps in a double-sided scanning process according to the first embodiment of the present invention.

A double-sided scanning process executed by the image scanning device 10 according to the first embodiment will next be described while referring to FIG. 4. In this process, the conveying section 100 sequentially conveys each original document accommodated in the document feeding section 110, and the image scanning section 200 scans both of front and rear surfaces of the original document. FIG. 4 is a flowchart of the double-sided scanning process, in which the CPU 600 executes the programs stored in the ROM 500, and, in association therewith, the image processing circuit 290 performs image-processings.

First, in S805, the CPU 600 controls the conveying section 100 to start conveying an original document along the conveying path indicated by the broken line in FIG. 2. The CPU 600 controls the first and second scanning control circuits 250 and 260 to start their scan-and-writing processes. The processing surface switching circuit 291b controls the selector 280 to initially select the first memory 270 in order to set the surface to be processed to the rear surface.

When the original document passes through the upstream side scanning position US along the conveying path, the first CIS 210 scans an image of the rear surface of the original document to generate scanned data of the image. The first scanning control circuit 250 converts the scanned data from analog to digital. The first scanned data output circuit 251 sequentially outputs on a line-by-line basis the scanned data which has been converted to digital by the first scanning control circuit 250 to write the scanned data into the first memory 270.

When the original document passes through the downstream side scanning position DS at the conveying path, the second CIS 230 scans an image of the front surface of the original document to generate scanned data of the image. The second scanning control circuit 260 converts the scanned data from analog to digital. The second scanned data output circuit 261 sequentially outputs on a line-by-line basis the scanned data which has been converted to digital by the second scanning control circuit 260 to write the scanned data into the second memory 275.

While the leading edge of the original document is located at a position between the upstream side scanning position US and the downstream side scanning position DS, the image on the rear surface of the original document is scanned. After the leading edge of the original document has reached the downstream side scanning position DS, the images on both of the rear and front surfaces of the original document are simultaneously scanned until the rear edge of the original document has passed through the upstream side scanning position US. After the rear edge of the original document has passed through the upstream side scanning position US, the image only on the front surface of the original document is scanned until the rear edge of the original document has reached the upstream side scanning position US.

Then, the routine advances to S810.

In S810, the image processing circuit 290 determines whether or not the scanned data of a predetermined number of lines has been stored in the first or second memory 270, 275 corresponding to the surface to be processed (initially the first memory 270), based on the number of lines indicated by the first or second counter 291a, 291c corresponding to the surface to be processed (initially the first counter 291a).

If a positive determination is made, (S810: Yes), the routine advances to S815. If a negative determination is made (S810: No), the routine advances to S830.

In S815, the scanned data readout circuit 291 reads out the scanned data of the predetermined number of lines from the first or second memory 270, 275 corresponding to the surface to be processed. The image processing circuit 290 image-processes the scanned data which has been read out from the first or second memory 270, 275. The scanned data which has been processed by the image processing circuit 290 is stored in a predetermined region of the RAM 400. Then, the routine advances to S820.

In S820, the CPU 600 determines whether or not the image processing circuit 290 has processed all the scanned data of the surface to be processed.

In order to perform this determination, the CPU 600 may control the first sensor 310 or the second sensor 320 to detect the size of the original document conveyed on the conveying path by a known method. Based on the detected size of the original document, the CPU 600 may determine the total number of lines to be scanned from each surface of the original document. By determining whether or not the image processing circuit 290 has processed the total number of lines' worth of scanned data of the surface to be processed, the CPU 600 may determine that the image processing circuit 290 has completed image-processing all the scanned data of the surface to be processed.

If a positive determination is made (S820: Yes), the routine advances to S825. If a negative determination is made (S820: No), the routine advances to S830.

In S825, the CPU 600 determines, based on the detection results of the first sensor 310 or the second sensor 320, whether there is another original document following the original document currently scanned. If the CPU 600 determines that there is such a following original document (S825: Yes), the routine advances to S830. If the CPU 600 determines that there is no following original document (S825: No), the routine advances to S835.

In S830, the switching circuit 291b controls the selector 280 to switch between the first and second memories 270, 275 to thereby select a memory that is other than a memory that is currently selected, thereby switching the surface to be processed from the surface currently processed to the other one. Then, the routine returns to S810.

On the other hand, in S835, the image processing circuit 290 image-processes a not-yet-processed region on a surface that is other than the surface to be processed.

More specifically, in S835, the surface to be processed is switched to the remaining one of the surfaces. Then, each time the scanned data of the surface to be processed is written into the memory 270 or 275 corresponding to the surface to be processed, the image processing circuit 290 reads out the scanned data from the subject memory and processes the scanned data. The processed scanned data is stored in the predetermined region of the RAM 400. When the CPU 600 determines that the image processing circuit 290 has processed the scanned data of the surface to be processed (last surface to be processed) for the total number of lines, the process ends.

[Effect]

According to the image scanning device 10 in the first embodiment, it is sufficient that each of the first memory 270 and the second memory 275 has only such a small memory capacity that corresponds to the predetermined number of lines plus a margin of a few lines of scanned data. In other words, even though the first memory 270 and the second memory 275 have such small capacities, the image processing circuit 290 can smoothly and properly process all the scanned data that is sequentially generated by the first scanning control circuit 250 and the second scanning control circuit 260.

It is not necessary that the first memory 270 maintain therein the scanned data of the original document that has been generated by the first CIS 210 until the leading edge of the original document reaches the downstream side scanning position DS. It is possible to set a sufficiently small number of lines as the predetermined number of lines. This can reduce memory capacities of the first memory 270 and the second memory 275.

Second Embodiment

Figure 5:
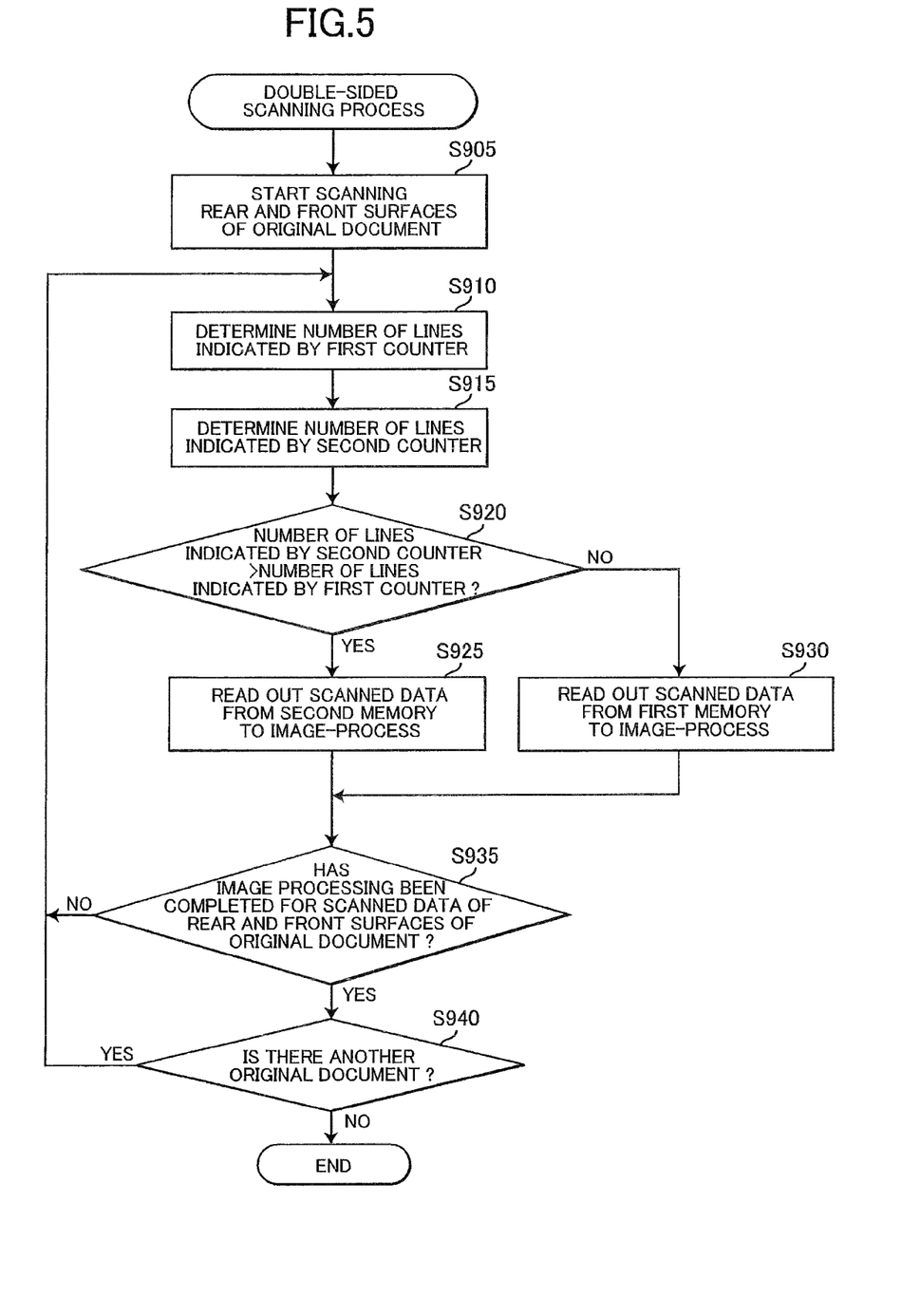
FIG. 5 is a flowchart illustrating steps in the double-sided scanning process according to a second embodiment of the present invention.

The double-sided scanning process executed by the image scanning device 10 may be modified as will be described below while referring to FIG. 5.

First, in S905, a process is executed in the same manner as in S805 in FIG. 4, except that the processing surface switching circuit 291b does not initially control the selector 280, to select the rear surface as the surface to be processed. The routine then advances to S910.

In S910, the image processing circuit 290 determines the number of lines indicated by the first counter 291a.

In S915, the image processing circuit 290 determines the number of lines indicated by the second counter 291c.

In S920, the image processing circuit 290 compares the number of lines indicated by the first counter 291a and the number of lines indicated by the second counter 291c with each other. If the number of lines indicated by the second counter 291c is greater than the number of lines indicated by the first counter 291a (S920: Yes), the routine advances to S925. On the other hands, if the number of lines indicated by the second counter 291c is less than or equal to the number of lines indicated by the first counter 291a (S920: No), the routine advances to S930.

In S925, the scanned data readout circuit 291 reads out all the scanned data stored in the second memory 275, and the image processing circuit 290 image-processes the scanned data read out from the second memory 275 by the scanned data readout circuit 291. The scanned data which has been processed by the image processing circuit 290 is stored in the predetermined region of the RAM 400. Then, the routine advances to S935.

On the other hand, in S930, the scanned data readout circuit 291 reads out all the scanned data stored in the first memory 270, and the image processing circuit 290 image-processes the scanned data read out from the first memory 270 by the scanned data readout circuit 291. The scanned data which has been processed by the image processing circuit 290 is stored in the predetermined region in the RAM 400. Then, the routine advances to S935.

In S935, the CPU 600 determines whether or not the image processing circuit 290 has processed all the scanned data of both of the front and rear surfaces of one-sheet's worth of the original document that is currently being processed.

In order to execute this determination, in the same manner as the first embodiment, the CPU 600 may control the first sensor 310 or the second sensor 320 to detect the size of the original document conveyed on the conveying path by a known method. Based on the detected size, the CPU 600 determines the total number of lines that is to be scanned from the front surface of the original document at the downstream side scanning position DS. By determining whether or not the image processing circuit 290 has processed the scanned data of the front surface of the original document for the total number of lines, the CPU 600 may determine whether or not both of the front and rear surfaces of the original document have been processed.

If a positive determination is made (S935: Yes), the routine advances to S940. If a negative determination is made (S935: Yes), the routine returns to S910.

In S940, the CPU 600 determines, based on the detection results of the first sensor 310 or the second sensor 320, whether there is another original document following the original document currently scanned. If the CPU 600 determines that there is such a following original document (S940:

Yes), the routine returns to S910. If the CPU 600 determines that there is no following original document (S940: No), the process ends.

[Effect]

According to the second embodiment, the image processing circuit 290 can process all the scanned data that is sequentially generated by the first scanning control circuit 250 and the second scanning control circuit 260. Hence, it is not necessary that the first memory 270 maintains therein the scanned data of the original document that has been generated by the first CIS 210 until the leading edge of the original document reaches the downstream side scanning position DS. Accordingly, this can reduce memory capacities of the first memory 270 and the second memory 275.

[Modifications]

(1) In the first and second embodiments, the image processing circuit 290 includes the first counter 291a and the second counter 291c. However, the image processing circuit 290 may not include the first counter 291a or the second counter 291c. The first scanning control circuit 250 may include the first counter 291a, and the second scanning control circuit 260 may include the second counter 291c, for example. Or, the first counter 291a and the second counter 291c may be provided separately from the first scanning control circuit 250, the second scanning control circuit 260, and the image processing circuit 290. Even with these arrangements, effects the same as those of the above described embodiments can be attained.

(2) In the first and second embodiments, the first scanning control circuit 250 and the second scanning control circuit 260 write scanned data generated by the corresponding first CIS 210 and the second CIS 230 into the first memory 270 and the second memory 275, without image-processing the scanned data. However, the first scanning control circuit 250 and the second scanning control circuit 260 may write into the first memory 270 and the second memory 275 the scanned data after executing corrections or the like on the scanned data. With this arrangement, the first scanning control circuit 250 and the second scanning control circuit 260 can share the processing load with the image processing circuit 290.

(3) Only a single memory can be provided in the image scanning section 200 in place of the first and second memories 270 and 275.

While the present invention has been described in detail with reference to the embodiments thereof, it would be apparent to those skilled in the art that various changes and modifications may be made therein without departing from the spirit of the present invention.

What is claimed is:

1. An image scanning device comprising:
a first image scanning unit that is configured to scan an image on one of surfaces of an original document conveyed along a conveying path at a predetermined first scanning position to sequentially output image data on a line-by-line basis, each line of the image data representing a line image extending in a main scanning direction that is perpendicular to a conveying direction, in which the original document is conveyed along the conveying path;
a second image scanning unit that is configured to scan an image on a remaining one of the surfaces of the original document conveyed along the conveying path at a predetermined second scanning position downstream along the conveying path from the first scanning position to sequentially output image data on a line-by-line basis, each line of the image data representing a line image extending in the main scanning direction;
a first storing unit that is configured to store the image data generated by the first image scanning unit;
a second storing unit that is configured to store the image data generated by the second image scanning unit;
a number of line determining unit that determines the number of lines of the image data that is stored in each of the first storing unit and the second storing unit;
a determining unit that executes a first determination to determine whether or not the number of lines of the image data stored in the first storing unit is greater than or equal to a predetermined number to obtain a first determination result, and that executes a second determination to determine whether or not the number of lines of the image data stored in the second storing unit is greater than or equal to the predetermined number to obtain a second determination result, the determining unit executing the first determination and the second determination in alternation with each other; and
a processing unit that is configured to be capable of reading out the image data on a line-by-line basis from each of the first storing unit and the second storing unit to image-process the readout data, the processing unit reading out the image data for the predetermined number of lines from the first storing unit and image-processing the readout data if the first determination result indicates that the number of lines of the image data stored in the first storing unit is greater than or equal to the predetermined number, the processing unit reading out the image data for the predetermined number of lines from the second storing unit and image-processing the readout data if the second determination result indicates that the number of lines of the image data stored in the second storing unit is greater than or equal to the predetermined number.

2. The image scanning device according to claim 1, wherein the processing unit executes processes for reading out the image data for the predetermined number of lines from one of the first storing unit and the second storing unit and image-processing the readout data at a speed at least twice as fast as a speed by which each of the first image scanning unit and the second image scanning unit executes processes for scanning the image of the original document to generate the image data for the predetermined number of lines and outputting the image data to the corresponding one of the first storing unit and the second storing unit.

3. The image scanning device according to claim 1, wherein a length of time required by the processing unit to execute processes for reading out the image data for the predetermined number of lines from one of the first storing unit and the second storing unit and image-processing the readout data is shorter than or equal to a half of a length of time required by each of the first image scanning unit and the second image scanning unit to execute processes for scanning the image of the original document to generate the image data for the predetermined number of lines and outputting the image data to the corresponding one of the first storing unit and the second storing unit.

4. An image scanning device comprising:
a first image scanning unit that is configured to scan an image on one of surfaces of an original document conveyed along a conveying path at a predetermined first scanning position to sequentially output image data on a line-by-line basis, each line of the image data representing a line image extending in a main scanning direction that is perpendicular to a conveying direction, in which the original document is conveyed along the conveying path;

a second image scanning unit that is configured to scan an image on a remaining one of the surfaces of the original document conveyed along the conveying path at a predetermined second scanning position downstream along the conveying path from the first scanning position to sequentially output image data on a line-by-line basis, each line of the image data representing a line image extending in the main scanning direction;

a first storing unit that is configured to store the image data generated by the first image scanning unit;

a second storing unit that is configured to store the image data generated by the second image scanning unit;

a number of line determining unit that determines the number of lines of the image data that is stored in each of the first storing unit and the second storing unit;

a determining unit that determines which of the first and second storing units stores a greater number of lines' worth of the image data than the other; and a processing unit that is configured to be capable of reading out the image data on a line-by-line basis from each of the first storing unit and the second storing unit to image-process the readout data, the processing unit reading out the image data from one of the first storing unit and the second storing unit that is determined by the determining unit, and image-processing the readout data.

5. The image scanning device according to claim 4, wherein the processing unit executes processes for reading out the image data for a predetermined number of lines from one of the first storing unit and the second storing unit and image-processing the readout data at a speed at least twice as fast as a speed by which each of the first image scanning unit and the second image scanning unit executes processes for scanning the image of the original document to generate the image data for the predetermined number of lines and outputting the image data to the corresponding one of the first storing unit and the second storing unit.

6. The image scanning device according to claim 4, wherein a length of time required by the processing unit to execute processes for reading out the image data for a predetermined number of lines from one of the first storing unit and the second storing unit and image-processing the readout data is shorter than or equal to a half of a length of time required by each of the first image scanning unit and the second image scanning unit to execute processes for scanning the image of the original document to generate the image data for the predetermined number of lines and outputting the image data to the corresponding one of the first storing unit and the second storing unit.

* * * * *